(12) United States Patent
Frank et al.

(10) Patent No.: US 8,520,165 B2
(45) Date of Patent: Aug. 27, 2013

(54) OPTICAL FILM LAMINATES

(75) Inventors: Lowell C. Frank, Hudson, WI (US); Stephen A. Johnson, Woodbury, MN (US); Ji-Hyung Kim, Kyonggi-Do (KR); Byung-Soo Ko, Seoul (KR); Ji-Hwa Lee, Gyeonggi-do (KR); Yufeng Liu, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 406 days.

(21) Appl. No.: 12/746,542

(22) PCT Filed: Dec. 8, 2008

(86) PCT No.: PCT/US2008/085858
§ 371 (c)(1),
(2), (4) Date: Jun. 7, 2010

(87) PCT Pub. No.: WO2009/076284
PCT Pub. Date: Jun. 18, 2009

(65) Prior Publication Data
US 2010/0277668 A1      Nov. 4, 2010

Related U.S. Application Data

(60) Provisional application No. 61/012,971, filed on Dec. 12, 2007.

(51) Int. Cl.
*G02F 1/1335* (2006.01)

(52) U.S. Cl.
USPC ............................. 349/62; 349/119; 349/122

(58) Field of Classification Search
None
See application file for complete search history.

(56) References Cited

U.S. PATENT DOCUMENTS

| | | | |
|---|---|---|---|
| 8,199,289 B2 * | 6/2012 | Murakami et al. | 349/118 |
| 2007/0242184 A1 | 10/2007 | Ohta et al. | |
| 2009/0091679 A1 * | 4/2009 | Park et al. | 349/48 |
| 2009/0279030 A1 * | 11/2009 | Toyama et al. | 349/117 |
| 2010/0060833 A1 * | 3/2010 | Ochiai et al. | 349/117 |

FOREIGN PATENT DOCUMENTS

| | | |
|---|---|---|
| JP | 11-271503 | 10/1999 |
| JP | 2007-055217 | 3/2007 |
| JP | 2007-156287 | 6/2007 |
| WO | WO 2007/086540 A1 | 8/2007 |

* cited by examiner

*Primary Examiner* — Richard Kim

(57) ABSTRACT

Optical film laminates of birefringent polyester films and adhesive are disclosed. The laminates have a thickness of at least 10 mils (0.25 mm). The laminates of the invention are useful in displays having a diagonal of 37 in (94 cm) or greater.

16 Claims, 1 Drawing Sheet

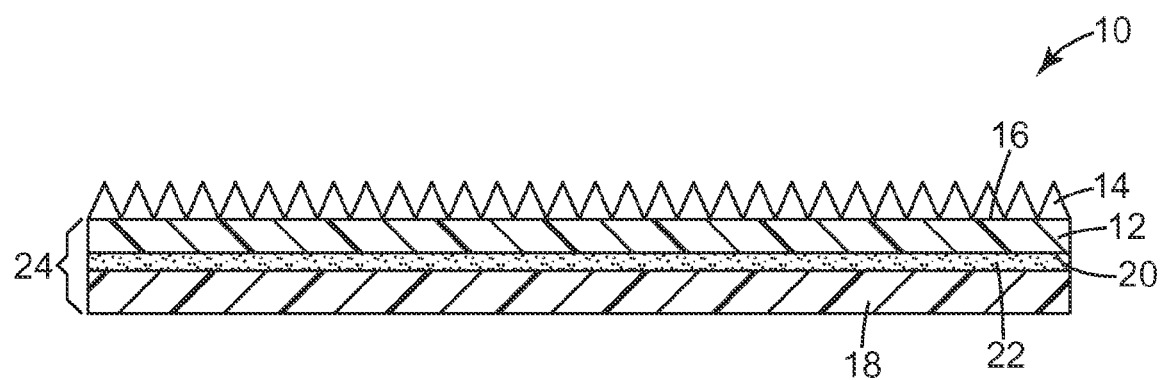

OPTICAL FILM LAMINATES

CROSS REFERENCE TO RELATED APPLICATIONS

This application is a national stage filing under 35 U.S.C. 371 of PCT/US2008/085858, filed Dec. 8, 2008, which claims priority to U.S. Application No. 61/012,971, filed Dec. 12, 2007, the disclosure of which is incorporated by reference in their entirety herein.

BACKGROUND

The present invention relates to optical film laminates.

The demand for ever greater size and brightness of LCD based displays has been increasing. Large display size, that is, a display having a diagonal greater than 37 in (94 cm), and higher power consumption, due to increased brightness demands, can cause large display films to become wavy over time. Wavy display films tend to cause defective images to be displayed on the display screen.

SUMMARY

The current invention provides a laminated brightness enhancement article that is self-supporting and resists waviness formation when used in a large LCD display.

The invention also provides optical displays which comprise a light source, an LCD panel, and an optical film laminate of the invention between the light source and the LCD panel.

BRIEF DESCRIPTION OF THE DRAWINGS

FIG. 1 is a cross section view of one embodiment of an optical film laminate of the invention.

DETAILED DESCRIPTION

In this application:

The recitation of numerical ranges by endpoint includes all numbers subsumed within that range (for example, 5-10 includes 5, 5.5, 6, 6.25, 7, 7.8, 8, 8.27, 9, 9.95, and 10);

"Structured surface" means a surface that has at least one geometric feature thereon and that has been created by any technique that imparts a desired geometric feature or plurality of geometric features to a surface. Such geometric structures have a pitch of from 30 to 300 micrometers. Examples of such geometric features include regular elongated prisms, random elongated prisms, discrete prisms, or beaded structures. Such structures can be applied by either cast and cure methods or by melt extrusion replication methods.

"Uniaxially oriented" means a film that is oriented only in one in-plane direction through stretching of the film in that in-plane direction. Typical draw ratios range from 1.2 to 10;

"Biaxially oriented" means is defined as stretching a film that is oriented in both in-plane directions through stretching the film in both directions. Typical draw ratios range from 1.2 to 8;

Birefringence arises when the electron density distribution is no longer random in materials, causing the light travels at different speed at different directions. In the case of films, birefringence can be obtained by either uniaxially or biaxial stretching the film. In order to characterize the birefringence of a given film, one usually defines the space according to the Cartesian coordinate system, taking the film surface as reference plane. In a roll-to-roll process, one takes the down-web direction within the film surface plane and names it machine direction (MD). The other in-plane direction that is perpendicular to the MD is the transverse direction (TD). The third direction is normal to the film surface plane and is named transmagnetic direction (TM). MD and TD are often referred as in-plane directions whereas TM is referred as out-of-plane direction.

For stretched films, the in-plane birefringence, $\Delta n_{in}$, is defined as the refractive index difference between the in-plane stretching direction and the in-plane un-stretched direction. For example, if a film was oriented in its TD direction, its in-plane birefringence is expressed by following equation:

$$\Delta n_{in} = n_{TD} - n_{MD} \tag{1}$$

Its out-of-plane birefringence, $\Delta n_{out}$, is defined as the refractive index difference between the average refractive index of in-plane directions and the film normal direction, as shown by the following equation.

$$\Delta n_{out} = \frac{(n_{MD} + n_{TD})}{2} - n_{TM} \tag{2}$$

Where $n_{MD}$, $n_{TD}$, $n_{TM}$ are refractive index of the film in three directions.

If $\Delta n_{in} > 0$, the film possesses positive in-plane birefringence and the material is positively birefringent. If $\Delta n_{in} < 0$, the film possesses negative in-plane birefringence and the material is negatively birefringent. Likewise, if $\Delta n_{out} > 0$, the film possesses positive out-of-plane birefringence and the material is positively birefringent. If $\Delta n_{out} < 0$, the film possesses negative out-of-plane birefringence and the material is negatively birefringent.

For uniaxially stretched films, both in-plane and out-of-plane birefringence are positive for positively birefringent polymers, or polymers with substantially positive stress-optical coefficient. For example, a constrained uniaxially stretched PET in TD direction by a draw ratio of 1×4 (MD×TD) will result in typical refractive index of 1.54, 1.66, 1.51 for MD, TD and TM, respectively. In this case, the in-plane birefringence is 0.12 whereas out-of-plane birefringence is 0.09, according to the equations (1) and (2), indicating PET is a positively birefringent polymer.

On the other hand, both in-plane and out-of-plane birefringence can be substantially close to zero for non-birefringent polymers, or polymers with essentially zero stress-optical coefficient. For example, stretching of polycarbonate will typically result in birefringence less than 0.005 in both in-plane and out-of-plane directions, indicating PC is not a strongly birefringent polymer.

For biaxially stretched films, in-plane birefringence can be substantially zero when the film is stretched equally in both in-plane directions. At the same time, the out-of-plane birefringence can be substantially positive due to the positive birefringent nature of the material. Either in-plane or out-of-plane birefringence is substantially larger or smaller than zero, the polymer is substantially birefringent. For example, a biaxially stretched PET film will draw ratios of 3.5 in both MD and TD has typical refractive index of 1.65, 1.65, and 1.50 for MD, TD and TM, respectively. In this case, the in-plane birefringence is 0.0 whereas out-of-plane birefringence is 0.15, according to the equations (1) and (2). The 0.15 out-of-plane birefringence is substantially larger than zero, indicating PET is a positively birefringent polymer.

Desirably, the out-of-plane birefringence of the laminates of the invention is higher than 0. In other embodiments, the out-of-plane birefringence of the laminates of the invention is higher than 0.05, higher than 0.10, or 0.15 or higher.

As shown in FIG. 1, optical film laminate 10 is comprised of a first polyester base film 12 having a structured surface 14 deposited on a first surface 16 of the first polyester base film. Second base film 18 is bonded to the second surface 20 of the first base film by means of an adhesive layer 22. The thickness 24 of the bonded first and second polyester base films is 10 mils (0.25 mm) or greater. In other embodiments, the thickness of the bonded first and second polyester base films is 11 mils (0.28 mm) or greater, 12 mils (0.30 mm) or greater, 13 mils (0.33 mm) or greater, or 14 mils (0.36 mm) or greater. In other embodiments, the thickness of the bonded first and second polyester base films is 10 to 40 mils (0.25 to 1.0 mm), 10 to 35 mils (0.25 to 0.89 mm), 10 to 30 mils (0.25 to 0.76 mm), or 10 to 25 mils (0.25 to 0.64 mm). The polyester base films are birefringent. In certain embodiments the polyester base films are uniaxially oriented and in other embodiments, the polyester base films are biaxially oriented.

Desirably, the base films of the laminates of the invention have substantially the same shrinkage in the machine direction, the transverse direction, or in both directions, according to the procedure presented below. In order to provide polyester base films having substantially the same shrinkage, the films can be heat treated under the same conditions. For example, polyester films can be exposed to temperatures of from 70 to 220° C. for a time ranging from 5 to 60 seconds. Desirably, the polyester base films have a shrinkage difference of less than 1% in both the machine and transverse directions. In other embodiments, the polyester base films have a shrinkage difference of less than 0.5% in both the machine and transverse directions.

The thickness of each of the first and second polyester base films range from 5 mils (0.18 mm) to 15 mils (0.38 mm). The thickness of the adhesive layer between the first and second base layers ranges from 0.005 mil (0.13 micrometers) to 5 mils (0.18 mm).

Useful polyester polymers used for making the first and second base films are polymers that are substantially transparent and having high stiffness, such materials include polyethylene terephthalate (PET), polyethylene naphthalate (PEN), polybutylene terephthalate (PBT), poly(ether esters), PET modified by at least one diacid, PET modified by at least one diol, PET modified by at least one diol and one diacid, PEN modified by at least one diacid, PEN modified by at least one diol, PEN modified by at least one diacid and one diol, and copolymers or blends of any of them.

The useful diol monomers include those having more than two hydroxyl groups, for example, triols, tetraols, and pentaols, may also be useful. In general, aliphatic diols and glycols are useful; examples include 1,6-hexanediol; 1,4-butanediol; trimethylolpropane; 1,4-cyclohexanedimethanol; 1,4-benzenedimethanol; neopentyl glycol; ethylene glycol; propylene glycol; polyethylene glycol; tricyclodecanediol; norbornane diol; bicyclo-octanediol; pentaerythritol; bisphenol A; and 1,3-bis(2-hydroxyethoxy)benzene.

The useful diacid monomers may comprise any dicarboxylate monomers known for preparing polyesters used in optical applications. As used herein, the terms "carboxylate" and "acid" are used interchangeably and include lower alkyl esters having from 1 to 10 carbon atoms. Examples of first dicarboxylate monomers include naphthalene dicarboxylic acid; terephthalate dicarboxylic acid; phthalate dicarboxylic acid; isophthalate dicarboxylic acid; (meth)acrylic acid; maleic acid; itaconic acid; azelaic acid; adipic acid; sebacic acid; norbornene dicarboxylic acid; bi-cyclooctane dicarboxylic acid; 1,6-cyclohexane dicarboxylic acid; t-butyl isophthalic acid; tri-mellitic acid; or combinations thereof; and which may be substituted by its dimethyl ester form.

Useful adhesive materials for use in the adhesive layers are those that are optically clear and provide substantial adhesion at the interface of the optical films. Useful optically clear adhesives include those selected from UV curable acrylate adhesives, heat sealing adhesives, pressure sensitive adhesives, heat curable adhesives, dry-laminate adhesives, sulfonated polyester adhesives, and ultra-thin adhesives. The adhesive may also contain UV absorbing agents to deter degradation and anti-static particles to aid in film handling. Generally, adhesive materials having glass transition temperatures ($T_g$) of 0° C. or greater in their final application form are desirable. In other embodiments, the adhesive materials have a Tg of 10° C. or greater.

Generally the optical film laminates of the invention are made by laminating two birefringent polyester base films together using an adhesive layer. Typically, one of the polyester base films would have a structured surface formed or deposited on one surface before being bonded or laminated to the other polyester base film. Typically, the surfaces of the films in contact with the adhesive are first treated with an adhesion promoter such as a primer or physical surface treatments such as plasma, corona, e-beam, or flash-lamp treatments. In certain embodiments, the primers may further contain anti-static particles. In embodiments where the structured surface is formed by depositing or casting a resin onto a surface of a polyester film, forming the resin into structures, and then curing the resin, the surface of the base polyester film in contact with the resin is also typically treated first with an adhesion promoter.

The structured surface may be disposed on a surface of the first base film by microembossing, incorporating a bulk diffusing material, such as beads into the film, by casting a resin, such as an acrylate resin, onto the surface and curing the resin.

The optical film laminates of the invention are useful in displays and particularly, those displays having a diagonal of greater than 37 in (94 cm), in other embodiments, 40 in (102 cm) or greater, 42 in (107 cm) or greater, 50 in (127 cm) or greater, 60 in (152 cm) or greater, 70 in (178 cm) or greater, or 100 in (254 cm) or greater. In other embodiments, the diagonal can range from greater than 37 to 70 in (94-178 cm).

In another embodiment, the invention provides optical displays that comprise a light source, (for example, backlight or lightguide), an LCD panel, and an optical film laminate of the invention between the light source and the light gating device. Typically, the structured surface of the optical film laminate would be facing up, or towards the LCD panel. The optical film may be adjacent to the light source or attached, or bonded to the light source.

The following examples illustrate aspects of the optical film laminates of the invention.

EXAMPLES

Test Methods:
Laminate Stiffness

The stiffness of films and laminates were determined on an INSTRON 3342 equipped with a 50N load cell and a 3-point bending fixture. Samples were 25 mm wide. The crosshead speed was 0.5 mm/min. Force was applied to the sample via the traveling crosshead, and the sample was contacted with an anvil having a 10 mm diameter. The two lower support anvils had a diameter of 3.94 mm each, and the center-to-center distance of these support anvils was 8.81 mm. Reported values in N/mm are based on the change in force N divided by the crosshead travel distance in mm for given change in force.

Measurement of Haze

The film haze was tested using a Hazeguard® instrument from BYK-Garner USA. Haze was measured according to ASTM D-1003.

Measurement of Gain, Brightness, Contrast and Uniformity

Gain of the laminated articles was measured on an illumination box, referred as a gain cube that was used as the light source. The gain cube comprised a highly reflective cavity, with the light passing out of a Teflon® surface to illuminate the samples. Baseline measurements were performed on top of the gain cube and then samples were placed on top of the gain cube and a measurement was taken. The gain was calculated by the luminance measured with a sample divided by the luminance measured without a sample on the gain cube.

The measurements brightness and uniformity were performed on an LCD-TV (37 in (94 cm) diagonal) with a backlight configuration of cover sheet/sample/diffuser sheet. A spectrometer calibrated with a human eye's response was used for measuring bright luminance. Bright luminance and dark luminance was measured at 13 evenly distributed points over the display area. The average bright luminance was calculated. Contrast was calculated as the ratio of bright to dark luminance. Uniformity was calculated as the ratio of lowest to highest luminance when the TV was turned on. Brightness, contrast, and uniformity of each sample were compared against that of a monolithic PET film having a thickness of 10 mil (0.25 mm). A value of 100% means the sample has a performance equivalent to that of the base film. A value higher than 100% (>2%) means the sample has better performance than the base film. A value lower than 100% (>2%) means the sample tested has less performance than the base film.

Temperature Gradient Test

Warp performance of samples was evaluated using the Temperature Gradient Test, which is a system capable of testing warp in a 37 in (94 cm) diagonal TV part in a controlled temperature gradient. The testing system consisted of an oven with a thermal bed capable of generating a precisely controlled temperature gradient. Each sample was tested with a thermal difference of 55, 50, 45, 35, and 30° C. across the sample to simulate thermal conditions in an actual LCD display. The system was programmed to cyclic heating (to the target gradient) and cooling (back to 23° C. throughout the part). The film surface topology was scanned during the cooling cycle to detect any wavy distortions, that is, warp. If warp was visually observed in the sample, the sample was marked as NG (not good). If warp was not visually observed, the sample was marked as G (good).

Module Warp Test

Warp resistance was tested using a 47 in (119 cm) LCD TV. Samples were cut, placed into the TV, and the TV was placed into an environmental chamber set at 60° C. and 90% relative humidity for 250 hours. The testing configuration was cover sheet/sample/diffuser sheet. After testing, the samples were taken out of the display and visually inspected for wavy distortions, that is warp. If warp was visually observed in the sample, the sample was marked as NG (not good). If warp was not visually observed, the sample was marked as G (good).

Shrinkage Test

Shrinkage was tested in both MD and TD. A convection oven capable of maintaining a target temperature within 2° C. was used with a set temperature of 150° C. Sample strips of 2.54 cm wide and 30 cm long were used. Two marks of 25.4 cm apart are drawn on the film to define the initial length ($L_0$). Samples were hung in the oven for 15 minutes. The final length between to the two marks is measured ($L_t$). Shrinkage was calculated as follows:

$$\text{Shrinkage, \%} = \frac{(L_0 - L_t)}{L_0} \times 100$$

Refractive Index Measurement

The refractive indices of the various samples were measured using a Metricon Prism coupler (Metricon Corporation, Pennington, N.J.) in the MD, TD, and TM directions. MD and TD are in-plane directions and TM is the sample normal.

Glossary:

| | |
|---|---|
| UVA1962 | UV curable acrylic adhesive, commercially available from Toagosei Co. Ltd., JP. Tg ~25° C. |
| UVA4856 | UV curable acrylic adhesive, commercially available from Toagosei Co. Ltd., JP. Tg ~25° C. |
| OCA | Optically clear adhesive, #8141, available from 3M Company, St. Paul, MN Tg ~−120° C. |
| PET | Polyethylene terephthalate films, biaxially oriented (draw ratio of about 3.5 × 3.5), obtained from 3M Company, St. Paul, MN. (Nominal thickness in mils) |
| 3/1ZZ | Transilwrap 3/1ZZ adhesive, commercially available from Transilwrap Company, Franklin Park, Illinois. Tg ~25° C. |
| WB54 | Sulfonated polyester adhesive, commercially available from 3M Company, St. Paul, MN Tg ~60° C. |

Sample Preparation

All samples were laminated with the films in the machine direction (MD).

Comparative example 1. A transparent PET film of 10 mil (0.25 mm) thickness was coated with WB54 on one side. An acrylic resin was then coated onto the surface using a roll-to-roll process. A mold was used to impart a structure. The structure was fixed by curing the acrylic resin under a UV lamp. The film showed some warp when tested according to the Module Warp Test and some warp when tested according to the Temperature Gradient Test. Comparative examples 2-3 were transparent PET films of 5 (0.13 mm) and 7 mil (0.18 mm) thickness. The films were not self-supportive (sagging) when sized to a 37 in (94 cm) diagonal and above. The films showed significant warp when tested according to the Temperature Gradient Test and showed significant warp when tested according to the Module Warp Test.

Comparative example 4 was a transparent PET film of 10 mil (0.25 mm) thickness. The film showed some warp when tested according to the Temperature Gradient Test and showed some warp when tested according to the Module Warp Test.

Comparative example 5 was a single layer polyethylene terephthalate cast web was made on a pilot melt extrusion line using a polyethylene terephthalate resin made as follows: A batch reactor was charged with 158.9 kg dimethyl terephthalate (DMT), 0.2 kg of trimethylol propane (TMP), 108.1 kg ethylene glycol (EG), 32 g zinc(II) acetate, 32 g cobalt(II) acetate, and 80 g antimony(III) acetate. Under pressure of 239.2 kPa, this mixture was heated to 257° C. to remove esterification reaction by-product, methanol. After the methanol was completely removed, 64 g of triethyl phosphonoacetate was charged to the reactor and the pressure was then gradually reduced to below 500 Pa while heating to 277° C. The condensation reaction by-product, ethylene glycol, was continuously removed until a resin having an intrinsic viscosity of about 0.60 dL/g, as measured in 60/40 wt. % phenol/o-dichlorobenzene at 23° C., was produced. The total extrusion rate was 272 kg/hr (600 lbs/hr). The melt temperature was at 265° C. The extrudate was cast with a film die onto a chill roll to make cast web. The cast web thickness was controlled by the casting speed such that the cast web was about 3.3 mm (130 mils). Such thickness would be necessary to form a 12 mil (0.30 mm) thick film after biaxial orientation. The cast web appeared cloudy and its haze was measured to be about 20%. Due to the high haze, it was believed that a 12 mil (0.30 mm) thick, highly transparent, and biaxially oriented PET film could not be made using the 3.3 mm thick cast web.

Comparative example 6 was a single-layer cast polyethylene terephthalate web made in the same manner as in Comparative example 5, except the thickness of the cast web was at about 3.7 mm (148 mils). Such thickness would be necessary to form a 14 mil (0.36 mm) thick film after biaxial orientation. The cast web appeared to be very cloudy and its haze was measured to be about 35%. Due to the high haze, it was believed that a 14 mil-thick (0.36 mm), highly transparent, biaxially oriented PET film could not be made using the thick cast web.

Comparative examples 7-8. Transparent PET films of 5 (0.13 mm) and 7 mil (0.18 mm) thickness were hand laminated using OCA adhesive. A 5 mil (0.13 mm) film was laminated to a 5 mil (0.13 mm) film with surfaces first coated with WB54 at the interfaces at ambient temperature. The films were brought together under about 1,000 psi (6.9 MPa) pressure. The adhesive was about 1 mil (0.03 mm) thick. Using the same process, a 7 mil (0.18) PET film was laminated to another 7 mil (0.18 mm) PET film using the same WB54 and OCA adhesives. The laminates remained flat but showed severe warp when tested according to the Temperature Gradient Test.

Examples 1-2

PET films of 5 (0.13) and 10 mil (0.25 mm) thickness were coated with WB54 on one side. A 5 mil (0.13 mm) film was laminated against a 10 mil (0.25 mm) film with coated surfaces at the interface. The process was carried out in a heated oven where the films were preheated to about 140° C. for 1 minute. Then the coated surfaces of the films were brought together under about 1,000 psi (6.9 MPa) pressure. Using the same procedure, a 10 mil (0.25 mm) PET film was laminated with another 10 mil (0.25 mm) PET film. The laminates remained flat and showed no warp when tested according to the Temperature Gradient Test.

Examples 3-7

PET films of 5 (0.13), 7 (0.18) and 10 mil (0.25 mm) thickness were coated with WB54 on one side. Laminates were made using UVA1962 as a second adhesive. The laminates remained flat and showed no warp when tested according to the Temperature Gradient Test.

Examples 8-10

Using the same process as described in Examples 3-7, laminates of 20.7 (0.52) to 25.5 mils (0.65 mm) thick were constructed using PET films of 7 (0.13) and 10 mil (0.25 mm) thick, except the adhesive was 3/1ZZ.

Example 11

A transparent PET film A of 5 mil (0.13 mm) was coated with WB54 on both sides. The film was then coated on one side using an acrylic resin by a roll to roll process and a prism mold was used to impart a structure. The structure was fixed by curing the acrylic resin under a UV lamp. Another 5 mil (0.13 mm) PET film B was coated with WB54 on one side. The coated PET film A was fed through a laminator along with the PET film B. The structure of film A was facing outwards. The WB54 coated surfaces faced each other in the lamination process. In between the two films, UVA4856 was used. The resulting laminate was cured using UV followed by oven curing. The laminate remained flat and showed no warp when tested according to the Module Warp Test.

Example 12

A Transparent PET film A of 5 mil (0.13 mm) was coated with WB54 on both sides. The film was then coated using an acrylic resin by a roll to roll process and a prism mold was used to impart a structure. The structure was fixed by curing the acrylic resin under a UV lamp. Another 5 mil (0.13 mm) PET film (the same as film A) was coated with WB54 on both sides (Film B). Film B was thermally treated for about 30 seconds at 100° C. in the same oven that was used to fully cure the structure on Film A. Coated PET film A was then fed through a laminator along with PET film B, with the structure of film A was facing outwards and the WB54 coated surfaces facing each other. In between the two films, UVA4856 was used. The resulting laminate was cured using UV lamps. The laminate remained flat and showed no warp when tested according to the Temperature Gradient Test and showed no warp when tested according to the Module Warp Test.

Examples 13

A transparent PET film A of 7 mil (0.18 mm) thickness was coated with WB54 on both sides. The PET A film was then coated using an acrylic resin by a roll to roll process and a prism mold was used to impart a structure. The structure was fixed by curing the acrylic resin under a UV lamp. Another 7 mil (0.18 mm) PET film B was coated with WB54 on one side. The coated PET film A was then fed through a laminator along with the PET film B, with the structure of film A facing outwards and the WB54 coated surfaces facing each other. In between each of the two films, UVA1962 was used. The resulting laminates were cured using UV lamps at a line speed of 12 ft/min (3.6 m/min). The laminate had a width of about 36 inch (91 cm). The laminate was converted to LCD-TV parts up to 70 in (178 cm) in diagonal. The laminates remained flat and showed no warp when tested according to the Temperature Gradient Test.

Example 14

A transparent PET film A of 7 mil (0.18 mm) thickness were coated with WB54 on both sides. The PET A film was then coated using an acrylic resin by a roll to roll process and a prism mold was used to impart a structure. The structure was fixed by curing the acrylic resin under a UV lamp. Another 7 mil (0.18 mm) PET film B was coated with WB54 on one side. The coated PET film A was then fed through a laminator along with the PET film B, with the structure of films A facing outwards and the WB54 coated surfaces facing each other. In between each of the two films, UVA1962 was used. The resulting laminates were cured using UV lamps at a line speed of 8 ft/min (2.4 m/min). The laminate had a width of about 36 inch (91 cm). The laminate was converted to LCD-TV parts up to 70 in (178 cm) in diagonal. The laminates remained flat and showed no warp when tested according to the Temperature Gradient Test.

Example 15

A transparent PET film A of 7 mil (0.18 mm) thickness was coated with WB54 on both sides. The film was then coated using an acrylic resin by a roll to roll process and a prism mold was used to impart a structure. The structure was fixed by curing the acrylic resin under a UV lamp. Another 7 mil (0.18 mm) PET film (the same as film A) was coated with WB54 on both sides (Film B). Film B was thermally treated for about 30 seconds at 100° C. in the same oven that was used to fully cure the structure on Film A. Film A experienced shrinkage of 1.53% (MD) and 2.59% (TD) and film B experienced shrinkage of 1.59% (MD) and 2.59% (TD). PET film A was then fed through a laminator along with PET film B, with the structure of film A was facing outwards and the WB54 coated surfaces facing each other. In between the two films UVA4856 was used. The resulting laminate was cured using UV lamps. The laminate remained flat and showed no warp when tested according to the Module Warp Test.

Example 16

A transparent PET film A of 5 mil (0.13 mm) thickness was coated with WB54 on both sides. The film was then coated using an acrylic resin by hand spray and a mold was used to impart a structure. The structure was fixed by curing the acrylic resin under a UV lamp. Another 10 mil (0.25 mm) PET film B was coated with WB54 on one side. PET film A was fed through a laminator along with PET film B with the structure of film A was facing outwards and the WB54 coated surfaces facing each other. In between the two films UVA1962 was used. The resulting laminate was cured using UV lamps. The laminate remained flat and showed no warp when tested according to the Temperature Gradient Test.

Example 17

A transparent PET film A of 10 mil (0.25 mm) thickness was coated with WB54 on both sides. The film was then coated using an acrylic resin by hand spray and a mold was used to impart a structure. The structure was fixed by curing the acrylic resin under a UV lamp. Another 10 mil (0.25 mm) PET film B was coated with WB54 on one side. PET film A was fed through a laminator along with PET film B with the structure of film A was facing outwards and the WB54 coated surfaces facing each other. In between the two films UVA1962 was used. The resulting laminate was cured using UV lamps. The laminate remained flat and showed no warp when tested according to the Temperature Gradient Test.

Example 18

A transparent PET film A of 7 mil (0.18 mm) thickness was coated with WB54 on both sides. The film was then coated using an acrylic resin by a roll to roll process and a prism mold was used to impart a structure. The structure was fixed by curing the acrylic resin under a UV lamp. Another 7 mil (0.18 mm) PET film B was coated with WB54 on both sides. Yet another 7 mil (0.18 mm) PET film C was coated with WB54 on one side. In between the films UVA1962 was used. The PET film A was fed through a laminator along with PET film B and PET film C with the structure of film A facing outwards and the WB54 coated surfaces facing each other. The resulting construction was A/B/C. The resulting laminate was cured using UV lamps at a line speed of 12 ft/min (3.6 m/min). The laminate had a width of about 36 inch (91 cm). The laminate was converted to LCD-TV parts up to 70 in (178 cm) in diagonal. The laminate remained flat and showed no warp when tested according to the Temperature Gradient Test.

Example 19

A transparent PET film A of 7 mil (0.18 mm) thickness was coated with WB54 on both sides. The film was then coated using an acrylic resin by a roll to roll process and a prism mold was used to impart a structure. The structure was fixed by curing the acrylic resin under a UV lamp. Another 7 mil (0.18 mm) PET film B was coated with WB54 on both sides. Yet another 7 mil (0.18 mm) PET film C was coated with WB54 on one side. In between the films UVA1962 was used. The PET film A was fed through a laminator along with PET film B and PET film C with the structure of film A facing outwards and the WB54 coated surfaces facing each other. The resulting construction was A/B/C. The resulting laminate was cured using UV lamps at a line speed of 8 ft/min (2.4 m/min). The laminate had a width of about 36 inch (91 cm). The laminate was converted to LCD-TV parts up to 70 in (178 cm) in diagonal. The laminate remained flat and showed no warp when tested according to the Temperature Gradient Test.

Example 20

A transparent PET film A of 5 mil (0.13 mm) was coated with WB54 on only one side. The film was then coated on the same side using an acrylic resin by a roll to roll process and a prism mold was used to impart a structure. The structure was fixed by curing the acrylic resin under a UV lamp. The film A was then surface treated using a corona discharge on the other side. Another 5 mil (0.13 mm) PET film (Film B) was treated on one side using a corona discharge. The coated PET film A was the fed through a laminator along with the PET film B. The structure of film A was facing outwards. The corona coated surfaces faced each other in the lamination process. In between the two films, UVA4856 was used. The resulting laminate was cured using UV followed by oven curing. The resulting laminate had good adhesion. The laminate remained flat and showed no warp when tested according to the Module Warp Test.

A summary of the structures of the laminates described above and stiffness results are shown below in Table 1.

TABLE 1

| Example | General Construction | Overall Thickness mil (mm) | Average Stiffness (N/mm) | Adhesive Thickness (mm) | Module Warp Test | Temperature Gradient Test |
|---|---|---|---|---|---|---|
| CE 1 | PET(10) | 11 (0.28) | 16.0 | na | NG | NG |
| CE 2 | PET(5) | 5.0 (0.13) | 2.0 | na | NG | NG |
| CE 3 | PET(7) | 7.0 (0.18) | 5.5 | na | NG | NG |
| CE 4 | PET(10) | 10.2 (0.26) | 16 | na | NG | NG |
| CE 7 | PET(5) + OCA + PET(5) | 11 (0.28) | 2.6 | 0.02 | na | NG |
| CE 8 | PET(7) + OCA + PET(7) | 15.0 (0.38) | 6.7 | 0.02 | na | NG |
| 1 | PET(10) + WB54 + PET(5) | 15.2 (0.39) | 54.0 | 0.002 | na | G |
| 2 | PET(10) + WB54 + PET(10) | 20.0 (0.51) | 114.0 | 0.002 | na | G |
| 3 | PET(7) + UVA1962 + PET(7) | 14.8 (0.38) | 22.7 | 0.02 | na | G |

TABLE 1-continued

| Example | General Construction | Overall Thickness mil (mm) | Average Stiffness (N/mm) | Adhesive Thickness (mm) | Module Warp Test | Temperature Gradient Test |
|---|---|---|---|---|---|---|
| 4 | PET(10) + UVA1962 + PET(5) | 16.1 (0.41) | 30.1 | 0.03 | na | G |
| 5 | PET(10) + UVA1962 + PET(7) | 18.0 (0.46) | 43.0 | 0.02 | na | G |
| 6 | PET(10) + UVA1962 + PET(10) | 21.1 (0.54) | 62.0 | 0.03 | na | G |
| 7 | PET(5) + UVA1962 + PET(5) | 12.3 (0.31) | 9.4 | 0.06 | na | G |
| 8 | PET(10) + 3/1ZZ + PET(7) | 22.0 (0.56) | 98.2 | 0.13 | na | G |
| 9 | PET(10) + 3/1ZZ + PET(10) | 25.5 (0.65) | 140 | 0.14 | na | G |
| 10 | PET(10) + 3/1ZZ + PET(5) | 20.7 (0.52) | 81.5 | 0.14 | na | G |
| 11 | PET(5) + UVA4856 + PET(5) | 11 (0.28) | 23 | 0.02 | G | na |
| 12 | PET(5) + UVA4856 + PET(5) | 11 (0.28) | 23 | 0.02 | G | na |
| 13 | PET(7) + UVA1962 + PET(7) | 16 (0.41) | 23 | 0.02 | na | G |
| 14 | PET(7) + UVA1962 + PET(7) | 16 (0.41) | 31 | 0.02 | na | G |
| 15 | PET(7) + UVA4856 + PET(7) | 16 (0.41) | 23 | 0.02 | G | na |
| 16 | PET(5) + UVA1962 + PET(10) | 17 (0.43) | 30 | 0.02 | na | G |
| 17 | PET(10) + UVA1962 + PET(10) | 22 (0.56) | 62 | 0.02 | na | G |
| 18 | PET(7) + UVA1962 + PET(7) + UVA1962 + PET (7) | 24 (0.61) | 37 | 0.02/0.02 | na | G |
| 19 | PET(7) + UVA1962 + PET(7) + UVA1962 + PET(7) | 24 (0.61) | 58 | 0.02/0.02 | na | G |
| 20 | PET(5) + UVA1962 + PET(5) | 11 (0.28) | 9.4 | 0.02 | G | na |

Samples were tested for optical performance. The results are shown below in Table 2.

TABLE 2

| Example | Substrate Thickness (mil) (mm) | Gain | Brightness (%) | Contrast (%) | Brightness Uniformity (%) |
|---|---|---|---|---|---|
| CE 1 | 11 (0.28) | 1.61 | 100% | 100% | 100.0% |
| 13 | 16 (0.41) | 1.64 | 101% | 103% | 100.0% |
| 14 | 16 (0.41) | 1.64 | 101% | 103% | 100.5% |
| 18 | 24 (0.61) | 1.62 | 99% | 103% | 99.3% |
| 19 | 24 (0.61) | 1.62 | 99% | 102% | 100% |

What is claimed is:

1. An optical film laminate comprising:
a first birefringent polyester base film having a structured surface disposed on a first surface of the first polyester base film;
a second birefringent polyester base film; and
an adhesive having a Tg of 0° C. or greater between the first and second birefringent polyester base films, wherein the adhesive bonds a surface of the second birefringent polyester base film to a second surface of the first polyester base film, wherein the thickness of the bonded first and second base films is 10 mils (0.25 mm) or greater, wherein the first and second base films have out-of-plane birefringence greater than 0.05.

2. The optical film laminate of claim 1 wherein the thickness of one of the first or second base films is at least 5 mils (0.13 mm).

3. The optical film laminate of claim 1 wherein the thickness of each of the first and second base films is at least 5 mils (0.13 mm).

4. The optical film laminate of claim 1 wherein the structured surface comprises prisms.

5. The optical film laminate of claim 1 wherein the structured surface comprises elongated prisms.

6. The optical film laminate of claim 1 wherein the first and second base films comprise a polyester selected from the group consisting of polyethylene terephthalate, polyethylene naphthalate, polybutylene terephthalate, poly(ether esters), polyethylene terephthalate modified by at least one diacid, polyethylene terephthalate modified by at least one diol, modified by at least one diol and one diacid, polyethylene naphthalate modified by at least one diacid, polyethylene naphthalate modified by at least one diol, polyethylene naphthalate modified by at least one diacid and one diol, and copolymers or blends there of.

7. The optical film laminate of claim 1 wherein the adhesive is two adhesive layers.

8. The optical film laminate of claim 1 wherein the surfaces of the first and second base films in contact with the adhesive are surface treated.

9. The optical film laminate of claim 1 wherein the first and second base films have a shrinkage difference of less than 1% in either MD or TD, as tested at 150° C. for 15 minutes.

10. An optical display comprising:
a light source;
an LCD panel; and
an optical film laminate according to claim 1 between the light source and the LCD panel.

11. The optical display of claim 10 further comprising a protective sheet on a viewing surface of the LCD panel.

12. The optical display of claim 11 wherein the viewing surface has at least a 94 cm diagonal.

13. The optical display of claim 10 wherein the optical film laminate is adjacent the light source.

14. The optical film laminate of claim 1 wherein the optical film laminate has a gain greater than or equal to about 1.62.

15. The optical film laminate of claim 1 wherein the optical film laminate has an average stiffness of greater than about 20 N/mm.

16. The optical film laminate of claim 1 wherein the adhesive is a UV curable acrylate adhesive or a sulfonated polyester adhesive.

\* \* \* \* \*